United States Patent
Kim et al.

(10) Patent No.: US 11,502,359 B2
(45) Date of Patent: Nov. 15, 2022

(54) SECONDARY BATTERY

(71) Applicant: SAMSUNG SDI CO., LTD., Yongin-si (KR)

(72) Inventors: Shin Jung Kim, Yongin-si (KR); Dae Kyu Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 288 days.

(21) Appl. No.: 16/754,666

(22) PCT Filed: Jul. 31, 2018

(86) PCT No.: PCT/KR2018/008713
§ 371 (c)(1),
(2) Date: Apr. 8, 2020

(87) PCT Pub. No.: WO2019/074199
PCT Pub. Date: Apr. 18, 2019

(65) Prior Publication Data
US 2020/0358048 A1 Nov. 12, 2020

(30) Foreign Application Priority Data
Oct. 11, 2017 (KR) .................. 10-2017-0130171

(51) Int. Cl.
*H01M 4/02* (2006.01)
*H01M 50/155* (2021.01)
(Continued)

(52) U.S. Cl.
CPC .......... *H01M 50/155* (2021.01); *C25D 11/04* (2013.01); *H01M 50/147* (2021.01); *H01M 50/183* (2021.01)

(58) Field of Classification Search
CPC ..................................................... H01M 4/02
See application file for complete search history.

(56) References Cited

U.S. PATENT DOCUMENTS 8,609,269 B2  12/2013  Yeo
2010/0273047 A1  10/2010  Kunoike et al.
(Continued)

FOREIGN PATENT DOCUMENTS

CN  102122702 A  7/2011
CN  109690811 A  4/2019
(Continued)

OTHER PUBLICATIONS

EPO Extended European Search Report dated May 7, 2021, issued in corresponding European Patent Application No. 18866949.3 (7 pages).
(Continued)

*Primary Examiner* — Jacob B Marks
(74) *Attorney, Agent, or Firm* — Lewis Roca Rothgerber Christie LLP

(57) ABSTRACT

Various embodiments of the present invention relate to a secondary battery, wherein a technical problem to be solved is to provide a secondary battery capable of maintaining an electrical insulating state between a case (can) and a cap assembly even after a gasket is melted due to short-circuiting and heat generation. To this end, the present invention provides a secondary battery comprising: a cylindrical can; an electrode assembly received, along with an electrolyte, in the cylindrical can; a cap assembly for sealing the cylindrical can; and a gasket interposed between the cylindrical can and the cap assembly, wherein the gasket further includes an insulating member having a melting temperature higher than a melting temperature of the gasket.

10 Claims, 6 Drawing Sheets

(51) Int. Cl.
  *C25D 11/04*    (2006.01)
  *H01M 50/147*  (2021.01)
  *H01M 50/183*  (2021.01)

(56) References Cited

U.S. PATENT DOCUMENTS

| 2011/0104538 A1 | 5/2011 | Yeo |
| 2011/0171507 A1 | 7/2011 | Kim |
| 2015/0221902 A1* | 8/2015 | Otake ............... H01M 50/197 429/94 |
| 2019/0363315 A1 | 11/2019 | Kim |

FOREIGN PATENT DOCUMENTS

| EP | 3518308 A1 | 7/2019 |
| EP | 3790077 A1 | 3/2021 |
| JP | 9-120806 A | 5/1997 |
| JP | 11-121017 A | 4/1999 |
| JP | 2008-204839 A | 9/2008 |
| KR | 10-0601521 B1 | 7/2006 |
| KR | 10-2008-0049547 A | 6/2008 |
| KR | 10-1084209 | 11/2011 |
| KR | 10-2015-0050154 A | 5/2015 |
| KR | 10-2017-0012137 A | 2/2017 |
| KR | 2017-0012137 * | 2/2017 |
| WO | 2014/017091 A1 | 1/2014 |

OTHER PUBLICATIONS

International Search Report of the International Searching Authority of corresponding PCT/KR2018/008713, dated Feb. 22, 2019, 3 pages.

Chinese Office Action dated Jan. 19, 2022, issued in Chinese Patent Application No. 201880075038.1 (7 pages).

* cited by examiner

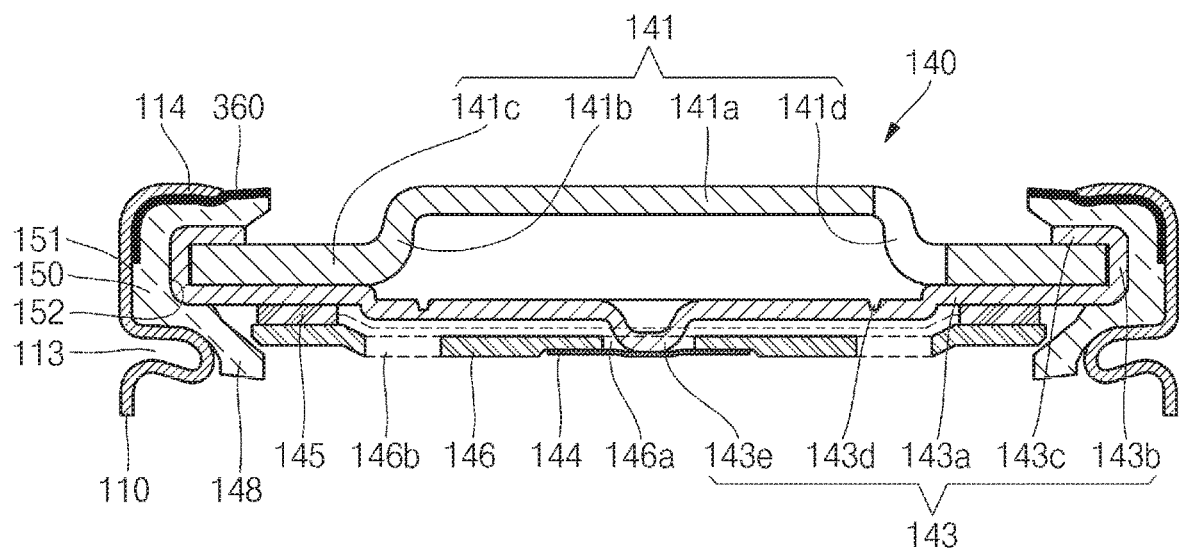
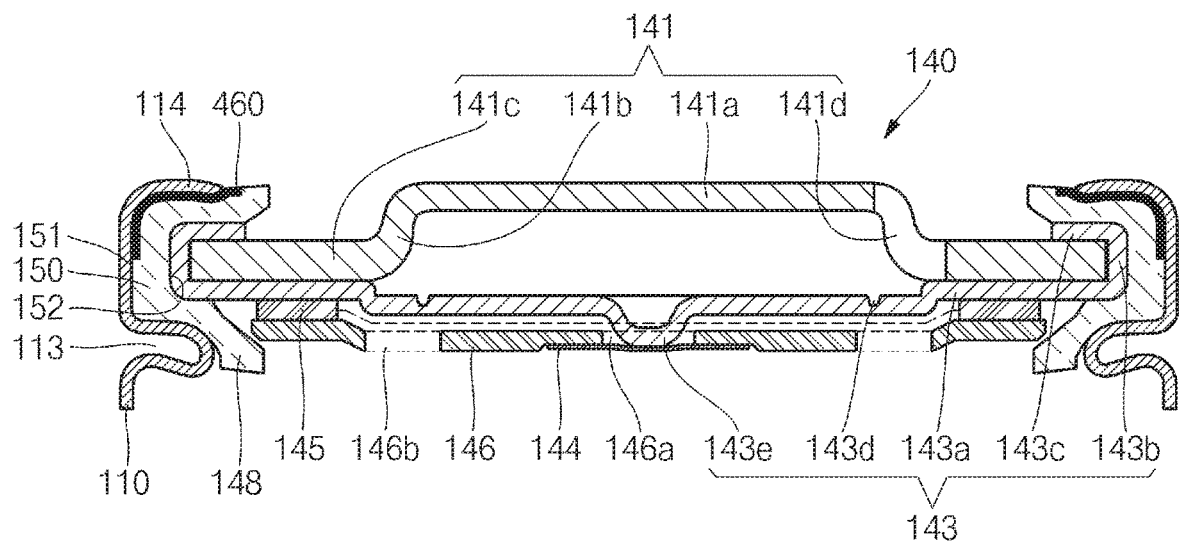

SECONDARY BATTERY

CROSS-REFERENCE TO RELATED APPLICATION(S)

This application is a National Phase Patent Application and claims priority to and the benefit of International Application Number PCT/KR20181008713, filed on Jul. 31, 2018, which claims priority to Korean Patent Application Number 10-2017-0130171, filed on Oct. 11, 2017, the entire contents of all of which are incorporated herein by reference.

TECHNICAL FIELD

Various embodiments of the present invention relate to a secondary battery.

BACKGROUND ART

Lithium ion secondary batteries are being widely used in portable electronic devices and power sources of hybrid automobiles or electric vehicles because of various advantages, including a high operation voltage, a high energy density per unit weight, and so forth.

The secondary battery may be classified as a cylindrical type, a prismatic type, or a pouch type. Specifically, the cylindrical secondary battery generally includes a cylindrical electrode assembly, a cylindrical can coupled to the electrode assembly, an electrolyte injected into the can to allow movement of lithium ions, and a cap assembly coupled to one side of the can to prevent leakage of the electrolyte and to prevent separation of the electrode assembly.

The above information disclosed in this Background section is only for enhancement of understanding of the background of the described technology and therefore it may contain information that does not form the prior art that is already known in this country to a person of ordinary skill in the art.

DESCRIPTION OF EMBODIMENTS

Technical Problem

Various embodiments of the present invention provide a secondary battery capable of preventing an electrical short between a cylindrical can and a cap assembly when an insulating gasket is melted.

Solution to Problem

According to various embodiments, provided is a secondary battery comprising: a cylindrical can; an electrode assembly received, along with an electrolyte, in the cylindrical can; a cap assembly for sealing the cylindrical can; and a gasket interposed between the cylindrical can and the cap assembly, wherein the gasket further includes an insulating member having a higher melting temperature than the gasket.

The gasket may be located between a beading part and a crimping part of the cylindrical can, and the gasket may include an exterior surface facing the cylindrical can, and an interior surface facing the cap assembly.

The insulating member is located between the exterior surface and the interior surface of the gasket.

The insulating member may be located at the interior surface of the gasket.

The insulating member may be located at the exterior surface of the gasket.

The insulating member may have one end bent to be exposed to the exterior side of the gasket or to be coupled to the interior side of the gasket.

The insulating member may include a surface-insulated metal sheet or an engineering plastic sheet.

The insulating member may include a surface-anodized aluminum sheet.

Advantageous Effects of Invention

As described above, various embodiments of the present invention provide a secondary battery capable of maintaining an electrical insulating state between a cylindrical can (case) and a cap assembly even after a gasket is melted due to short-circuiting and heat generation. That is to say, according to various embodiments of the present invention, the secondary battery further includes and the insulating member having a higher melting temperature than the insulating gasket located at the interior side or exterior side of the gasket, thereby preventing an electrical short between the cylindrical can and the cap assembly even when the gasket is melted. Of course, various embodiments of the present invention provides a secondary battery capable of preventing leakage of electrolyte or infiltration of moisture by preventing the sealing capacity of the insulating gasket from degrading in spite of the presence of the insulating member.

BRIEF DESCRIPTION OF DRAWINGS

FIGS. 2A to 2F are cross-sectional views illustrating various relationships between a cylindrical can and a cap assembly in the secondary battery according to various embodiments of the present invention.

BEST MODE

Figure 1A:
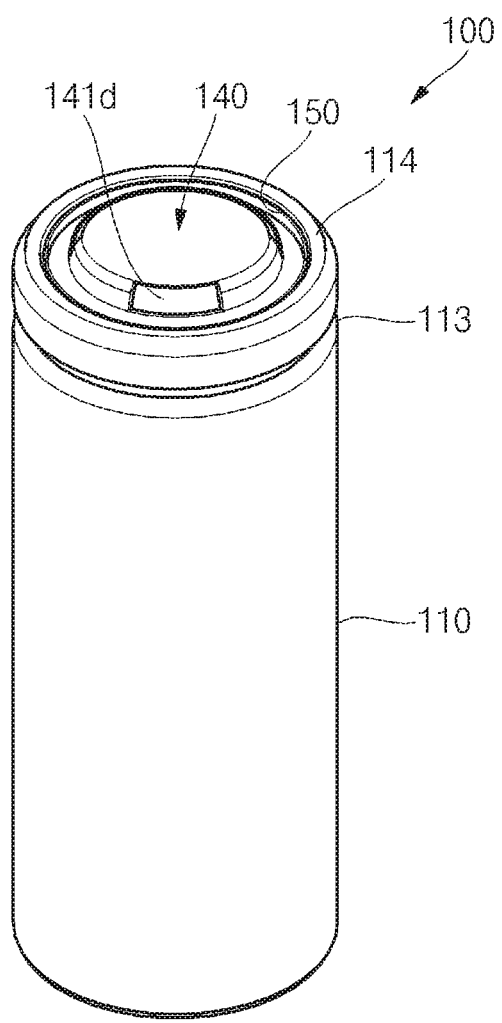
FIGS. 1A, 1B and 1C are a perspective view, a cross-sectional view and an exploded perspective view of a secondary battery according to various embodiments of the present invention.

Hereinafter, a preferred embodiment of the present invention will be described in detail.

Various embodiments of the present invention may be embodied in many different forms and should not be construed as being limited to the example embodiments set forth herein. Rather, these example embodiments of the invention are provided so that this invention will be thorough and complete and will convey inventive concepts of the invention to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Figure 1B:
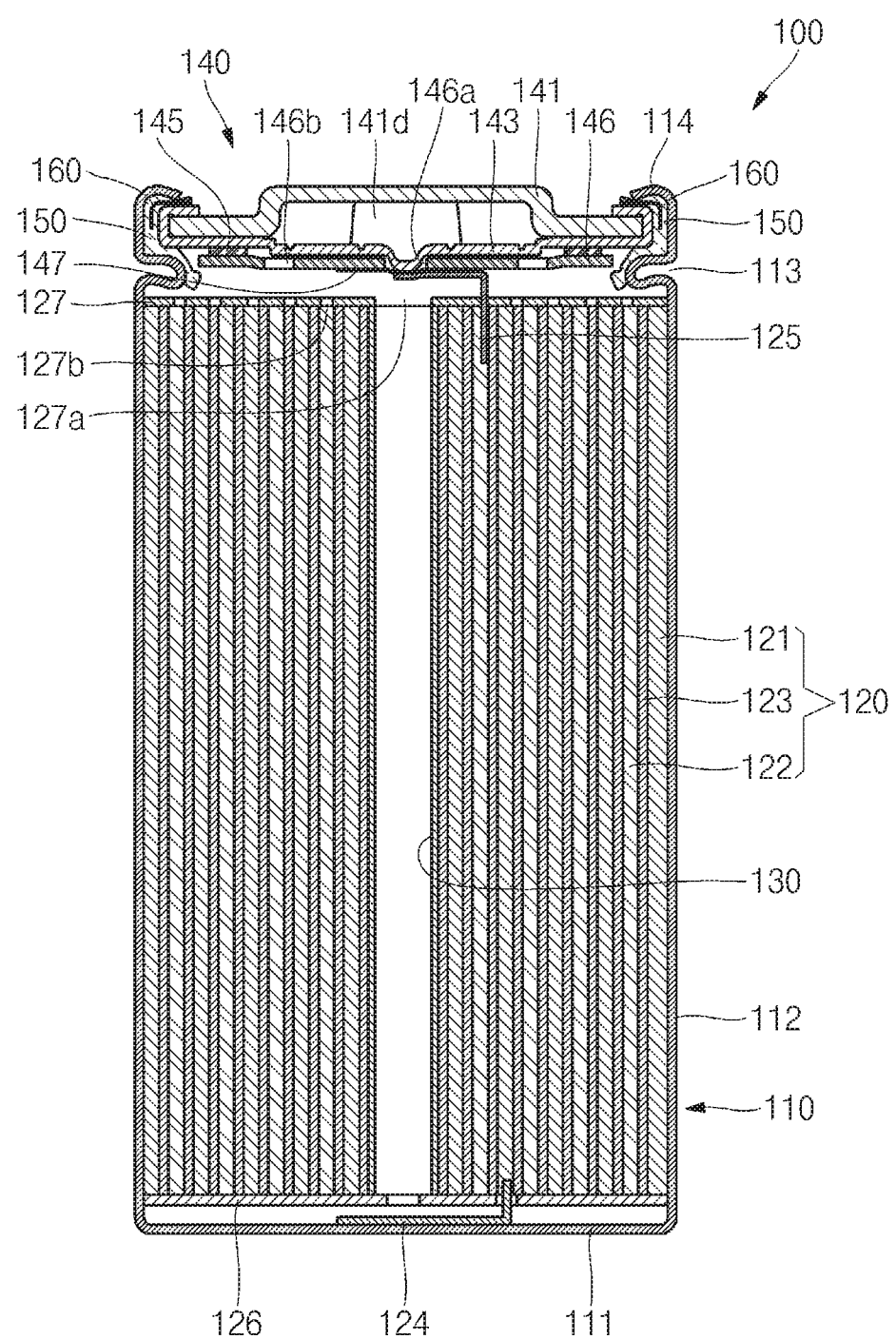
Figure 1C:
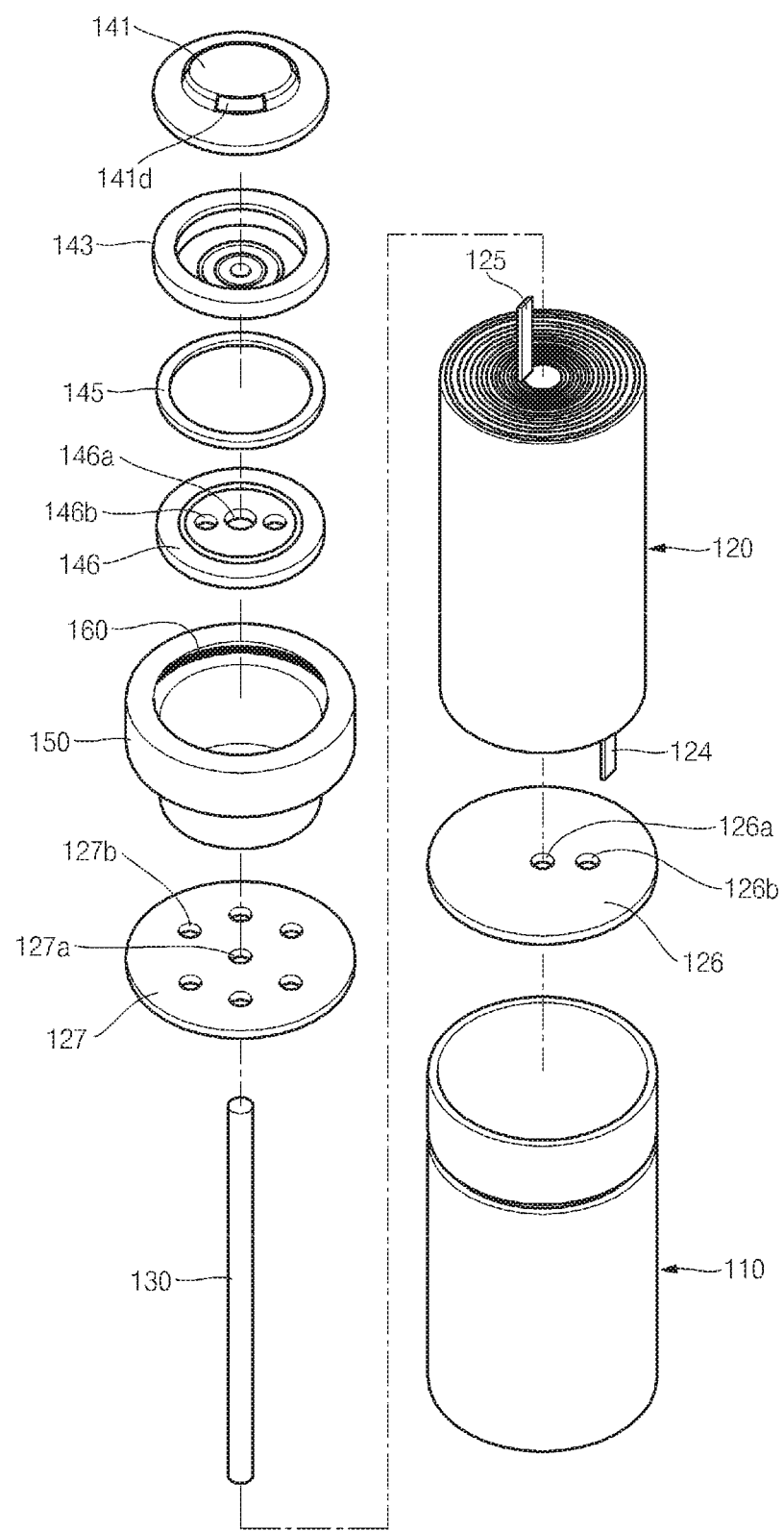

FIGS. 1A, 1B and 1C are a perspective view, a cross-sectional view and an exploded perspective view of a secondary battery according to various embodiments of the present invention.

As illustrated in FIGS. 1A, 1B and 1C, the secondary battery 100 according to various embodiments includes a cylindrical can 110, an electrode assembly 120, a cap assembly 140, an insulation gasket 150, and an insulation member 160. In addition, the secondary battery 100 of the present invention may further include a center pin 130 coupled to the electrode assembly 120.

The cylindrical can 110 includes a substantially circular bottom portion 111, and a side wall 112 extending upward by a given length from the bottom portion 111. During the manufacture of a secondary battery, a top portion of the cylindrical can 110 is in an open state. Therefore, the electrode assembly 120 may be inserted into the cylindrical can 110 together with an electrolyte. The cylindrical can 110 may be made of steel, a steel alloy, nickel plated steel, a nickel plated steel alloy, aluminum, an aluminum alloy, or an equivalent thereof, but aspects of the present invention are not limited thereto. In addition, in order to prevent separation of the cap assembly 140, the cylindrical can 110 may include a beading part 113 recessed inward at its lower portion and a crimping part 114 recessed inward at its upper portion.

The electrode assembly 120 is received in the cylindrical can 110, The electrode assembly 120 includes an anode plate 121 coated with an anode active material (e.g., graphite or carbon), a cathode active material (e.g., a transition metal oxide such as $LiCoO_2$, $LiNiO_2$, or $LiMn_2O_4$), and a separator 123 positioned between the first electrode plate 121 and the second electrode plate 122 and allowing only lithium ions to move therebetween while preventing an electrical short circuit therebetween. The anode plate 121, the cathode plate 122 and the separator 123 are wound in a substantially cylindrical configuration. Here, the anode plate 121 may include a copper (Cu) or nickel (Ni) foil, the cathode plate 122 may include an aluminum (Al) foil, and the separator 123 may include polyethylene (PE) or polypropylene (PP), but aspects of the present invention are not limited thereto. In addition, an anode tab 124 downwardly protruding and extending by a predetermined length may be welded to the anode plate 121, and a cathode tab 125 upwardly protruding and extending by a predetermined length may be welded to the cathode plate 122, and vice versa. In addition, the anode tab 124 may be made of copper or nickel, and the cathode tab 125 may be made of aluminum, but aspects of the present invention are not limited thereto.

Additionally, the anode tab 124 of the electrode assembly 120 may be welded to the bottom portion 111 of the cylindrical can 110. Therefore, the cylindrical can 110 may operate as an anode. Conversely, the cathode tab 125 may be welded to the bottom portion 111 of the cylindrical can 110. In this case, the cylindrical can 110 may operate as a cathode.

In addition, a first insulating plate 126 coupled to the cylindrical can 110 and having a first hole 126a formed at its center and a second hole 126b formed at its exterior side may be interposed between the electrode assembly 120 and the bottom portion 111. The first insulating plate 126 may prevent the electrode assembly 120 from electrically contacting the bottom portion 111 of the cylindrical can 110. In particular, the first insulating plate 126 prevents the cathode plate 122 of the electrode assembly 120 from electrically contacting the bottom portion 111. When a large amount of gas is generated due to abnormality of the secondary battery, the first hole 126a allows the gas to rapidly move upward through the center pin 130, and the second hole 216b allows the anode tab 124 to pass therethrough to then be welded to the bottom portion 111.

In addition, a second insulating plate 127 coupled to the cylindrical can 110 and having a centrally located first hole 127a and a plurality of second holes 127b formed along the outer side of the first hole 127a may be interposed between the electrode assembly 120 and the cap assembly 140. The second insulating plate 127 may prevent the electrode assembly 120 from electrically contacting the cap assembly 140. In particular, the second insulating plate 127 prevents the anode plate 121 of the electrode assembly 120 from electrically contacting the cap assembly 140. When a large amount of gas is generated due to abnormality of the secondary battery, the first hole 127a allows the gas to rapidly move toward cap assembly 140, and one of the second holes 127b allows the cathode tab 125 to pass therethrough to then be welded to the cap assembly 140. In addition, the remaining second holes 127b may allow the electrolyte an electrolyte to rapidly flow into the electrode assembly 120 during an electrolyte injecting process.

Additionally, each of the first holes 126a and 127a of the first and second insulating plates 126 and 127 has a smaller diameter than the center pin 130, and thus the center pin 130 may not electrically contact the bottom portion 111 of the cylindrical can 110 or the cap assembly 140 due to external shocks.

The center pin 130, which is shaped of a hollow cylindrical pipe, may be coupled to a substantially central portion of the electrode assembly 120. The center pin 130 may be made of steel, a steel alloy, nickel plated steel, a nickel plated steel alloy, aluminum, an aluminum alloy, or polybutyleneterephthalate an equivalent thereof, but aspects of the present invention are not limited thereto. The center pin 130 may suppress deformation of the electrode assembly 120 during charging and discharging and may serve as a movement path of the gas generated inside the secondary battery 100. In some cases, the center pin 130 may not be installed.

The cap assembly 140 may include a cap-up 141 having a plurality of throughholes 141d, a safety plate 143 installed under the cap-up 141, a connection ring 145 installed under the safety plate 143, a cap-down 146 coupled to the connection ring 145 and having first and second throughholes 146a and 146b, and a sub plate 147 fixed to a bottom surface of the cap-down 146 and electrically connected to the cathode tab 125.

The throughholes 146d formed in the cap-up 141 and the throughholes 146b formed in the cap-down 146 may discharge the internal gas to the outside when an internal pressure of the cylindrical can 110 increases due to abnormality such as overcharge. The internal pressure makes the safety plate 143 upwardly inverted and electrically disconnected from the sub plate 147. Then, the safety plate 143 is ruptured and the internal gas is discharged to the outside.

The insulating gasket 150 covers the cap-up 141, the safety plate 143, the connection ring 145 and the cap-down 146 in a substantially circular ring shape, and thus electrically insulates these elements sequentially in that order from the side wall 112 of the cylindrical can 110. The insulating gasket 150 is configured to be compressed substantially between the beading part 113 and the crimping part 114, which are formed on the side wall 112 of the cylindrical can 110.

The insulating gasket 150 may include, for example, a heat-resistant resin, but aspects of the present invention are not limited thereto. The heat-resistant resin may include, for example, two or more selected from the group consisting of polypropylene (PP), polyethylene (PE), polyimide (PI), polybutyleneterephthalate (PBT), polycarbonate (PC), and polystyrene (PS), but aspects of the present invention are not limited thereto.

The heat-resistant resin contained in the insulating gasket 150 may have a melting temperature of about 150° C. to about 250° C. Accordingly, if the temperature of the secondary battery 100 rises to about 250° C. or higher, the insulating gasket 150 may be melted. Therefore, if the insulating member 160, which will later be described, is not present, a direct electrical short may occur between the cylindrical can 110, i.e., the crimping part 114, and the cap assembly 140, i.e., the safety plate 143, as the result of the melting of the insulating gasket 150.

The insulating member 160 may be located at the interior side or the exterior side of the insulating gasket 150. In particular, since the insulating member 160 is interposed between the crimping part 114 formed at the side wall 112 of the cylindrical can 110 and the cap assembly 140, the crimping part 114 of the cylindrical can 110 may prevent the cylindrical can 110 from being directly electrically shorted to the cap assembly 140, i.e., the safety plate 143, even if the insulating gasket 150 is melted. That is to say, the insulating member 160 may prevent an end of the crimping part 114 from directly electrically contacting the safety plate 143 of the cap assembly 140. To this end, the insulating member 160 of the cap assembly 140 may include, for example, but not limited to, an insulation-treated metal or a super engineering plastic.

Specifically, the insulation-treated metal may be a surface-anodized aluminum sheet having a melting temperature of about 660° C. Here, the surface-anodized aluminum sheet may serve as an electrically insulating layer. In addition, the insulation-treated metal may include an insulating layer on its surface and may include copper having a melting temperature of about 1085° C., steel having a melting temperature of about 15385° C., or a nickel having a melting temperature of about 1455° C.

In addition, the super engineering plastic may include two or more materials selected from the group consisting of polyimide (PI), polysulfone (PSF), poly phenylene sulfide (PPS), polyimide imide (PAI), polyacrylate (PAR), polyether sulfone (PES), polyether ether ketone (PEEK), polyether imide (PEI), liquid crystal polyester (LCP), and polyether ketone (PEK), each of which has a higher melting temperature than a general engineering plastic. In particular, the insulating member 160 may include materials having a melting temperature of about 250° C. or higher, among the super engineering plastic materials.

Meanwhile, an electrolyte (not shown) is injected into the cylindrical can 110 and allows movement of lithium ions generated by an electrochemical reaction in the anode plate 121 and the cathode plate 122 during charging and discharging of the battery. The electrolyte may be a nonaqueous organic electrolyte including a mixture of a lithium salt and high-purity organic solvent. In addition, the electrolyte may be a polymer using a solid electrolyte, but aspects of the present invention are not limited thereto.

In such a manner, the secondary battery 100 according to the embodiment of the present invention may maintain an electrical insulating state between the can 110 and the cap assembly 140 through the insulating member 160 even after the insulating gasket 150 is melted due to short-circuiting and heat generation. That is to say, the secondary battery 100 according to the embodiment further includes the insulating member 160 formed at the interior or exterior side of the insulating gasket 150, the insulating member 160 having a higher melting temperature than the insulating gasket 150, and thus the insulating member 160 may still remain even after the insulating gasket 150 is melted, thereby preventing an electrical short between the can 110 and the cap assembly 140.

FIGS. 2A to 2F are cross-sectional views illustrating various relationships between a cylindrical can 110 and a cap assembly 140 in the secondary battery according to various embodiments of the present invention.

The cap-up 141 of the cap assembly 140 may include a terminal portion 141a, a bent portion 141b, and an extending portion 141c. The terminal portion 141a is substantially planar, and a cathode lead tab (not shown) is connected thereto. The bent portion 141b is downwardly bent from the periphery of the terminal portion 141a and may include one or more openings 141d. The extending portion 141c may horizontally extend from the bottom end of the bent portion 141b to the exterior side.

The cap assembly 140 may be made of one selected from the group consisting of general aluminum, an aluminum alloy, steel, a steel alloy, nickel plated steel, a nickel plated steel alloy, but aspects of the present invention are not limited thereto.

The safety plate 143 of the cap assembly 140 includes a main body 143a, a main body bent portion 143b, and a main body extending portion 143c. The main body 143a is located roughly under the cap-up 141 and has a plurality of vent grooves 143d located on its surface, and a lower protrusion 143e downwardly protruding roughly at its center and connected to a sub plate 144. The main body bent portion 143b is upwardly bent from the periphery of the main body 143a to then cover the periphery of the extending portion 141c of the cap-up 141. In addition, the main body extending portion 143c inwardly extends from the main body bent portion 143b in a horizontal direction to then cover the top surface of the extending portion 141c of the cap-up 141. That is to say, the main body bent portion 143b of the safety plate 143 covers some regions of the extending portion 141c of the cap-up 141. Here, the main body 143a located at the end of the safety plate 143, the main body bent portion 143b, and the main body extending portion 143c are in a substantially U-shaped (⊂ or ⊃) configuration.

The safety plate 143 may be made of one selected from the group consisting of general aluminum, an aluminum alloy, steel, a steel alloy, nickel plated steel, a nickel plated steel alloy, but aspects of the present invention are not limited thereto.

Meanwhile, the insulating gasket 150 is closely adhered to the exterior side of the safety plate 143. That is to say, the insulating gasket 150 is located between the beading part 113 and the crimping part 114 of the side wall 112 of the cylindrical can 110 and is configured to roughly cover the circumference of the safety plate 143 of the cap assembly 140. The insulating gasket 150 also covers the peripheries of the connection ring 145 and the cap-down 146. Leakage of the electrolyte and infiltration of external moisture may be efficiently prevented by the insulating gasket 150.

In detail, the insulating gasket 150 includes an exterior surface 151 facing the cylindrical can 110 and an interior surface 152 facing the cap assembly 140. In more detail, the exterior surface 151 of the insulating gasket 150 faces the side wall 112 of the cylindrical can 110, and the interior surface 152 of the insulating gasket 150 faces the safety plate 143 of the cap assembly 140, that is, the main body 143a, the main body bent portion 143b and the main body extending portion 143c of the safety plate 143.

Figure 2A:
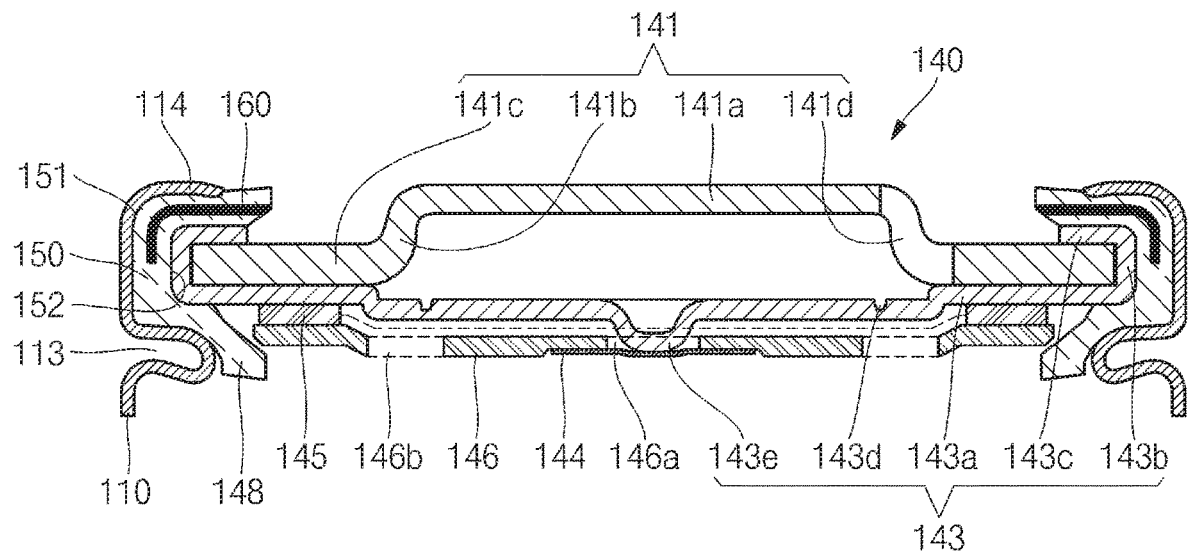

As illustrated in FIG. 2A, the insulating member 160 is configured to be substantially bent between the exterior and interior surfaces 151 and 152 of the insulating gasket 150.

In other word, one side region of the insulating member 160 is substantially parallel with the main body bent portion 143b of the safety plate 143, and the other side region of the insulating member 160 is substantially parallel with the main body extending portion 143c of the safety plate 143. Such a bent configuration of the insulating member 160 can be commonly applied to all embodiments of the present disclosure.

In a normal state, the insulating member 160 is not in contact with the cap assembly 140 of the cylindrical can 110. In addition, one end of the insulating member 160 is exposed to the exterior side through the insulating gasket 150, and the other end thereof extends to the interior side of the insulating gasket 150. Here, the other end of the insulating member 160 may be configured to extend to a location corresponding to the of the main body bent portion 143b of the safety plate 143, but aspects of the present invention are not limited thereto.

In such a manner, the insulating gasket 150, which is flexible relative to the insulating member 160, may contact the cylindrical can 110 and the cap assembly 140, thereby efficiently preventing leakage of the electrolyte or infiltration of moisture. In addition, the insulating member 160 may still remain between cylindrical can 110 and the cap assembly 140 even after the insulating gasket 150 is melted, thereby preventing a direct electrical short between the can 110 and the cap assembly 140.

Figure 2B:
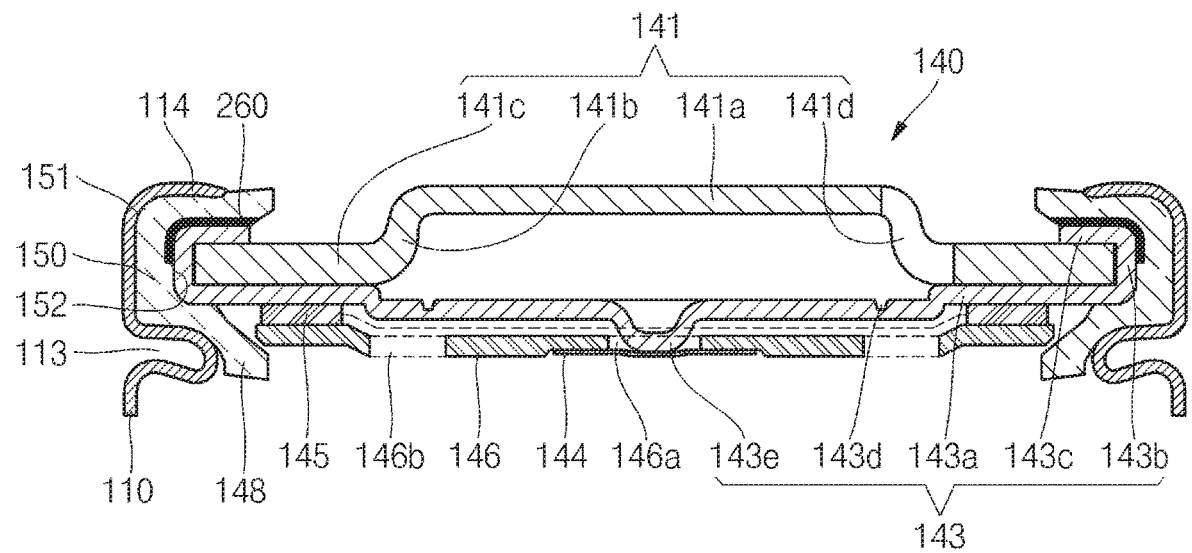

Next, as illustrated in FIG. 2B, an insulating member 260 may be formed at the interior surface 152 of the insulating gasket 150. That is to say, in a normal state, the insulating member 260 is maintained at a state in which it is in contact with the main body bent portion 143b and the main body extending portion 143c of the safety plate 143. In addition, the exterior surface 151 of the insulating gasket 150 is maintained at a state in which it is in contact with a sidewall of the cylindrical can 110, that is, the crimping part 114.

Therefore, the insulating gasket 150, which is flexible relative to the insulating member 260, may contact the cylindrical can 110, thereby efficiently preventing leakage of the electrolyte or infiltration of moisture. In addition, the insulating member 260 may still remain between cylindrical can 110 and the cap assembly 140 even after the insulating gasket 150 is melted, thereby preventing a direct electrical short between the can 110 and the cap assembly 140.

Next, as illustrated in FIG. 2C, an insulating member 360 may be formed at the exterior surface 151 of the insulating gasket 150. That is to say, in a normal state, the insulating member 360 is maintained at a state in which it is roughly in contact with the crimping part 114 of the side wall 112 of the cylindrical can 110. Here, the interior surface 152 of the insulating gasket 150 is maintained at a state in which it is in contact with the cap assembly 140, that is, the main body 143a, the main body bent portion 143b and the main body extending portion 143 of the safety plate 143.

Therefore, the insulating gasket 150, which is flexible relative to the insulating member 360, may contact the cap assembly 140, thereby efficiently preventing leakage of the electrolyte or infiltration of moisture. In addition, the insulating member 360 may still remain between cylindrical can 110 and the cap assembly 140 even after the insulating gasket 150 is melted, thereby preventing a direct electrical short between the can 110 and the cap assembly 140.

Next, as illustrated in FIG. 2D, an insulating member 460 may be formed at a region of the exterior surface 151 of the insulating gasket 150. In particular, the insulating member 460 may be formed at a region corresponding to the end of the crimping part 114. That is to say, in a normal state, the insulating member 460 is maintained at a state in which it is roughly in contact with the end of the crimping part 114 of the side wall 112 of the cylindrical can 1101. Here, the interior surface 152 of the insulating gasket 150 is maintained at a state in which it is in contact with cap assembly 140, that is, the main body 143a, the main body bent portion 143b and the main body extending portion 143 of the safety plate 143.

Therefore, the insulating gasket 150, which is flexible relative to the insulating member 460, may contact the cap assembly 140, thereby efficiently preventing leakage of the electrolyte or infiltration of moisture. In addition, the insulating member 460 may still remain between cylindrical can 110 and the cap assembly 140 even after the insulating gasket 150 is melted, thereby preventing a direct electrical short between the can 110 and the cap assembly 140.

Figure 2E:
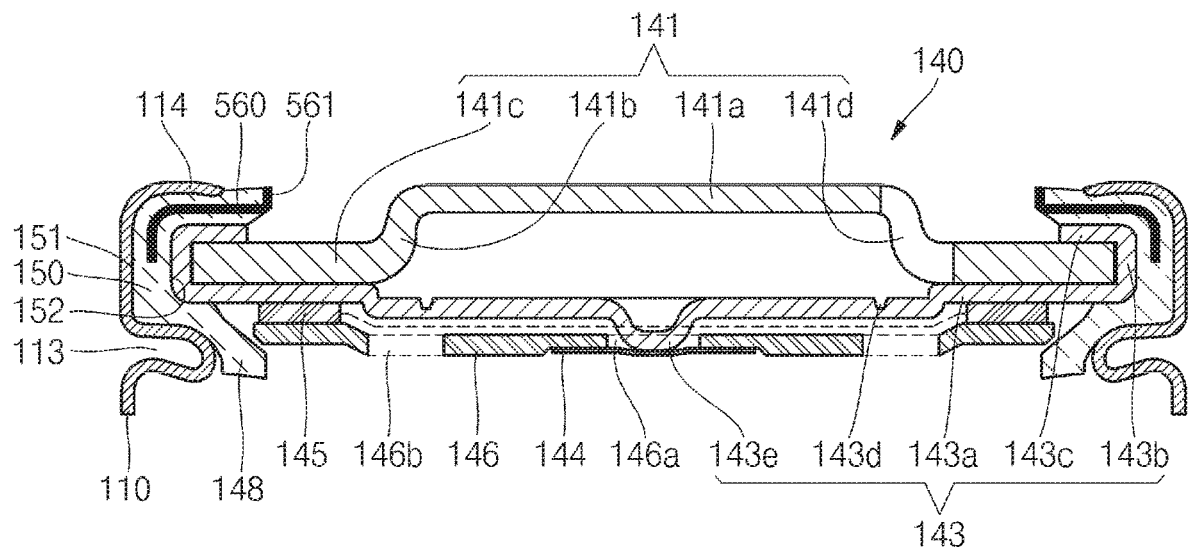

Therefore, Next, as illustrated in FIG. 2E, an insulating member 560 may be located between the exterior and interior sides of the insulating gasket 150, and one end 561 thereof is configured to be bent to face upwardly or downwardly. With this configuration, a contact area between the insulating member 560 and the insulating gasket 150 is increased, thereby further enhancing the coupling force between the insulating member 560 and the insulating gasket 150.

Figure 2F:
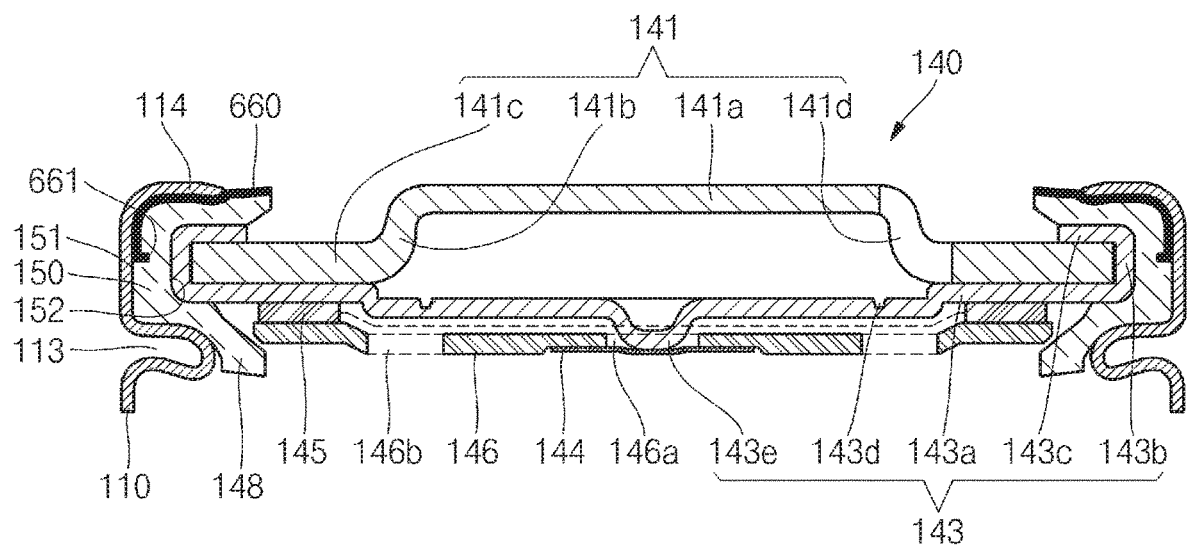

Finally, as illustrated in FIG. 2F, an insulating member 660 may be formed at the exterior surface 151 of the insulating gasket 150 and may have the other end thereof is bent to be coupled to the interior side of the insulating gasket 150. With this configuration, a contact area between the insulating member 660 and the insulating gasket 150 is increased, thereby further enhancing the coupling force between the insulating member 660 and the insulating gasket 150.

Meanwhile, the insulating gasket 150 and the insulating member 160 may be formed by, for example, but not limited to, an insert molding process, a double injection molding process, or an inter-assembling process following separate fabrication processes, but aspects of the present invention are not limited thereto.

Here, in the insert molding process, for example, a heterogenous or dichroic gasket and an insulating member including an insulation-treated metal, or a gasket and an insulating member including a super engineering plastic, are integrated in a mold. That is to say, the insulating member 160 including an insulation-treated metal or a super engineering plastic is first placed in a mold, and a melted resin (e.g., the insulating gasket 150) is then injected into the mold under high-temperature and high-pressure conditions, thereby obtaining an injection molding product having the insulating member 160 formed at the interior surface 152, the exterior surface, or both of the interior surface 152 and the exterior surface of the insulating gasket 150.

In addition, in the double injection molding process, for example, the insulating member 160 is first injection molded using a super engineering plastic, and a melted resin (e.g., the insulating gasket 150) is then injected to one side of the insulating member 160 or is then injected to cover the insulating member 160, thereby obtaining an injection molding product.

In the inter-assembling process following separate fabrication processes, for example, the insulating gasket 150 and the insulating member 160 are separately fabricated, and then assembled with each other. For example, the insulating gasket 150 having an inwardly recessed groove of a predetermined depth, and the insulating member 160 shaped of a circular ring, are separately fabricated, and the insulating member 160 is then engaged with the groove of the insulating gasket 150, thereby obtaining an inter-assembled product. Of course, the circular ring shaped insulating member 160 may be coupled to the exterior surface 151 of the insulating gasket 150, or the circular ring shaped insulating member 160 may be coupled to the interior surface 152 of the insulating gasket 150.

Although the foregoing embodiments have been described to practice the secondary battery of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

The invention claimed is:

1. A secondary battery comprising:
a cylindrical can;
an electrode assembly received, along with an electrolyte, in the cylindrical can;
a cap assembly for sealing the cylindrical can;
a gasket interposed between the cylindrical can and the cap assembly; and
an insulating member arranged on the gasket and having a higher melting temperature than the gasket,
wherein a lower end of the insulating member is spaced apart from a lower end of the gasket.

2. The secondary battery of claim 1, wherein the gasket is located between a beading part and a crimping part of the cylindrical can, and the gasket comprises an exterior surface facing the cylindrical can, and an interior surface facing the cap assembly.

3. A secondary battery comprising:
a cylindrical can;
an electrode assembly received, along with an electrolyte, in the cylindrical can;
a cap assembly for sealing the cylindrical can;
a gasket interposed between the cylindrical can and the cap assembly; and
an insulating member having a higher melting temperature than the gasket,
wherein the gasket is located between a beading part and a crimping part of the cylindrical can, and the gasket comprises an exterior surface facing the cylindrical can, and an interior surface facing the cap assembly, and
wherein the insulating member is located between the exterior surface and the interior surface of the gasket.

4. The secondary battery of claim 2, wherein the insulating member is located at the interior surface of the gasket.

5. The secondary battery of claim 2, wherein the insulating member is located at the exterior surface of the gasket.

6. The secondary battery of claim 2, wherein the insulating member has one end bent to be exposed to an exterior of the gasket or to be coupled to an interior of the gasket.

7. The secondary battery of claim 1, wherein the insulating member includes a surface-insulated metal sheet or an engineering plastic sheet.

8. The secondary battery of claim 1, wherein the insulating member includes a surface-anodized aluminum sheet.

9. The secondary battery of claim 1, wherein, from an end of the crimping part, the gasket extends farther than the insulating member.

10. The secondary battery of claim 6, wherein the one end of the insulating member is bent so as to extend transverse to a thickness of the gasket.

* * * * *